(12) United States Patent
Kim et al.

(10) Patent No.: US 10,627,823 B1
(45) Date of Patent: Apr. 21, 2020

(54) METHOD AND DEVICE FOR PERFORMING MULTIPLE AGENT SENSOR FUSION IN COOPERATIVE DRIVING BASED ON REINFORCEMENT LEARNING

(71) Applicant: Stradvision, Inc., Pohang-si, Gyeongsangbuk-do (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang-si (KR)

(\*) Notice: Subject to any disclaimer, the term of this patent is extended or adjusted under 35 U.S.C. 154(b) by 0 days.

(21) Appl. No.: 16/723,820

(22) Filed: Dec. 20, 2019

Related U.S. Application Data

(60) Provisional application No. 62/798,967, filed on Jan. 30, 2019.

(51) Int. Cl.
*G05D 1/02* (2020.01)
*G06K 9/62* (2006.01)
(Continued)

(52) U.S. Cl.
CPC ......... *G05D 1/0221* (2013.01); *G06K 9/6259* (2013.01); *G06K 9/6289* (2013.01); *G06N 3/049* (2013.01); *H04W 4/46* (2018.02)

(58) Field of Classification Search
CPC ....... G05D 1/0221; H04W 4/46; G06N 3/049; G06K 9/6259; G06K 9/6289
See application file for complete search history.

(56) References Cited

U.S. PATENT DOCUMENTS 6,853,906 B1\* 2/2005 Michi ................ B60K 31/0008
701/410
10,486,707 B2\* 11/2019 Zelman .................. G08G 1/163
(Continued)

*Primary Examiner* — Tyler J Lee
(74) *Attorney, Agent, or Firm* — Kaplan Breyer Schwarz, LLP

(57) ABSTRACT

A method for learning a sensor fusion network for sensor fusion of an autonomous vehicle performing a cooperative driving is provided. The method includes steps of: a learning device, (a) inputting (i) a driving image including the autonomous vehicle, m cooperatively-driving vehicles, and second virtual vehicles and (ii) sensor status information on n sensors in the m cooperatively-driving vehicles into the sensor fusion network, to generate sensor fusion probabilities of sensor values of the n sensors being transmitted and generate fusion sensor information on s sensors having large probabilities, (b) inputting a road-driving video into a detection network, to detect the second virtual vehicles, pedestrians, and lanes and output nearby object information, and inputting sensor values and the nearby object information into a drive network, to generate moving direction probabilities and drive the autonomous vehicle and (c) acquiring traffic condition information, generating a reward, and learning the sensor fusion network.

26 Claims, 5 Drawing Sheets

COOPERATIVELY-
DRIVING VEHICLES

OTHER VEHICLES

(51) Int. Cl.
*H04W 4/46* (2018.01)
*G06N 3/04* (2006.01)

(56) References Cited

U.S. PATENT DOCUMENTS

| | | | |
|---|---|---|---|
| 10,553,117 B1* | 2/2020 | Johnson | G08G 1/167 |
| 2007/0043506 A1* | 2/2007 | Mudalige | B60T 7/22 |
| | | | 701/301 |
| 2012/0271540 A1* | 10/2012 | Miksa | G01S 13/865 |
| | | | 701/409 |
| 2014/0121880 A1* | 5/2014 | Dolgov | G01C 21/3407 |
| | | | 701/23 |
| 2015/0217765 A1* | 8/2015 | Tokoro | B60W 50/0205 |
| | | | 701/1 |
| 2017/0190334 A1* | 7/2017 | Zelman | B60W 30/18154 |
| 2017/0197627 A1* | 7/2017 | Wieneke | G06K 9/00791 |
| 2017/0232970 A1* | 8/2017 | Schaper | B60W 10/04 |
| | | | 701/36 |

* cited by examiner

METHOD AND DEVICE FOR PERFORMING MULTIPLE AGENT SENSOR FUSION IN COOPERATIVE DRIVING BASED ON REINFORCEMENT LEARNING

CROSS REFERENCE TO RELATED APPLICATION

This application claims the benefit of priority to U.S. Provisional Patent Application No. 62/798,967, filed on Jan. 30, 2019, the entire contents of which are incorporated herein by reference.

FIELD OF THE DISCLOSURE

The present disclosure relates to a method and a device for use with an autonomous vehicle, virtual driving, and the like; and more particularly, to the method and the device for performing a multiple agent sensor fusion based on a reinforcement learning in a cooperative driving.

BACKGROUND OF THE DISCLOSURE

Automobiles have recently been transformed into environmentally friendly and advanced automobiles that incorporate IT technologies. In addition to development of automobile technology, intelligent automobiles are being commercialized where technologies like accident prevention, accident avoidance, crash safety, improved convenience, vehicle informatization, autonomous driving, etc. are applied.

Such an intelligent automobile is a vehicle that supports comfort functions through voice recognition and assistance for coping with distraction or misoperation by a driver, and that not only reduces accidents caused by the driver's negligence but also reduces time, fuel waste, exhaust gas, etc.

An autonomous vehicle is a collection of intelligent automobile technologies. When the driver enters the vehicle and inputs a desired destination, an optimal route from the present location to the destination is generated and the vehicle drives itself without any intervention from the driver.

In addition, the vehicle can recognize traffic lights and signs on roads, maintain proper speed according to the traffic flow, actively cope with possible accidents by recognizing dangerous situations, keep itself in lane, and if need be, can steer itself for lane-changing, obstacle avoiding, passing, etc. to reach the destination.

Meanwhile, the autonomous vehicle uses various sensors for detecting its driving environment, and these sensors are set to operate at all time regardless of the driving environment.

Accordingly, there is a problem in that even sensors unnecessary according to the driving environment at the moment are continuously operated, so that a large amount of power is consumed by the autonomous vehicle.

In order to solve such a problem, conventional methods adopt sensor fusion to use only optimal sensors necessary for detection of the driving environment.

Also, recently, although the autonomous vehicles can share information with one another over V2V communication, i.e., vehicle-to-vehicle communication, since a large amount of sensor data is transmitted and received, a large amount of communication resources is consumed, and since all the transmitted and received sensor data must be processed, consumption of computing resources is also huge.

SUMMARY OF THE DISCLOSURE

It is an object of the present disclosure to solve all the aforementioned problems.

It is another object of the present disclosure to transmit and receive only necessary sensor information over V2V (vehicle to vehicle) communication.

It is still another object of the present disclosure to acquire accurate sensor information needed, over the V2V communication.

It is still yet another object of the present disclosure to acquire optimal sensor information in a cooperative driving situation.

In accordance with one aspect of the present disclosure, there is provided a method for learning a sensor fusion network to be used for sensor fusion of an autonomous vehicle performing a cooperative driving, including steps of: (a) if (i) a driving image for training including (i-1) a subject autonomous vehicle, (i-2) m cooperatively-driving vehicles for training having first virtual vehicles performing the cooperative driving with the subject autonomous vehicle, and (i-3) second virtual vehicles performing a non-cooperative driving and (ii) multiple pieces of sensor status information for training on n sensors for training in each of the m cooperatively-driving vehicles for training are acquired, a learning device performing a process of inputting the driving image for training and the multiple pieces of the sensor status information for training into the sensor fusion network, to thereby allow the sensor fusion network (a-1) to generate sensor fusion probabilities for training which are probabilities of said each of the m cooperatively-driving vehicles for training transmitting each of sensor values of each of the n sensors for training over V2V communication for the cooperative driving, by applying its neural network operation to the driving image for training and the multiple pieces of the sensor status information for training and (a-2) to generate fusion sensor information for training on s sensors for training having probabilities larger than a preset threshold among the sensor fusion probabilities for training wherein s is an integer ranging from 1 to m×n; (b) the learning device performing a process of inputting a road-driving video for training acquired over the V2V communication in response to the fusion sensor information for training into a detection network, to thereby allow the detection network to detect at least part of the second virtual vehicles, one or more pedestrians, and one or more lanes on a traveling road of the subject autonomous vehicle and thus to output nearby object information for training, and a process of inputting both sensor values for training, acquired over the V2V communication in response to the fusion sensor information for training, and the nearby object information for training into a drive network, to thereby allow the drive network to generate moving direction probabilities for training of said each of the m cooperatively-driving vehicles for training by referring to the sensor values for training and the nearby object information for training, and thus to drive the subject autonomous vehicle by referring to the moving direction probabilities for training; and (c) the learning device performing a process of acquiring traffic condition information for training on the subject autonomous vehicle driven by the drive network, a process of generating a reward by referring to the traffic condition information for training, and a process of learning the sensor fusion network by using the reward.

As one example, at the step of (a), the learning device performs a process of inputting the driving image for training and the multiple pieces of the sensor status information for training into the sensor fusion network, to thereby allow the sensor fusion network to (i) generate a feature map for training by applying convolution operation using a CNN to the driving image for training and generate an image feature vector for training by applying fully-connected operation to the feature map for training, (ii) generate a sensor status feature vector for training by applying recurrent neural network operation using at least one LSTM to the multiple pieces of the sensor status information for training, and (iii) generate a concatenated feature vector for training by concatenating the image feature vector for training and the sensor status feature vector for training and generate the sensor fusion probabilities for training by applying fully-connected operation of at least one fully connected layer to the concatenated feature vector for training.

As one example, the learning device updates at least one parameter of the CNN, the at least one LSTM, and the at least one fully connected layer which are included in the sensor fusion network, by using the reward.

As one example, the learning device instructs the sensor fusion network to (i) allow a pooling layer to apply max-pooling operation to the feature map for training and then (ii) apply fully-connected operation to a result of said (i), to thereby generate the image feature vector for training.

As one example, the learning device normalizes and outputs each of the sensor fusion probabilities for training using a softmax algorithm.

As one example, the reward is generated by subtracting the number of the s sensors for training from a sum of the number of the n sensors for training in each of the m cooperatively-driving vehicles for training, and wherein the learning device increases or decreases the reward by referring to the traffic condition information for training.

As one example, the driving image for training is an entire road image of an entire road on which the m cooperatively-driving vehicles for training is in the cooperative driving, and is an image with m+1 channels which represents whether each of blocks of a certain size, into which the entire road image is divided as a grid, is occupied by said each of the m cooperatively-driving vehicles for training or by all of the second virtual vehicles, and wherein each of m channels among said m+1 channels corresponds to said each of the m cooperatively-driving vehicles for training, and a remaining channel among said m+1 channels corresponds to the second virtual vehicles.

In accordance with another aspect of the present disclosure, there is provided a method for testing a sensor fusion network to be used for sensor fusion of an autonomous vehicle performing a cooperative driving, including steps of: (a) on condition that a learning device has performed, if (i) a driving image for training including (i-1) a subject autonomous vehicle for training, (i-2) m cooperatively-driving vehicles for training having first virtual vehicles performing the cooperative driving with the subject autonomous vehicle for training, and (i-3) second virtual vehicles performing a non-cooperative driving and (ii) multiple pieces of sensor status information for training on n sensors for training in each of the m cooperatively-driving vehicles for training are acquired, (1) a process of inputting the driving image for training and the multiple pieces of the sensor status information for training into the sensor fusion network, to thereby allow the sensor fusion network (1-1) to generate sensor fusion probabilities for training which are probabilities of said each of the m cooperatively-driving vehicles for training transmitting each of sensor values of each of the n sensors for training over V2V communication for the cooperative driving, by applying its neural network operation to the driving image for training and the multiple pieces of the sensor status information for training and (1-2) to generate fusion sensor information for training on s sensors for training having probabilities larger than a preset threshold among the sensor fusion probabilities for training wherein s is an integer ranging from 1 to m×n, (2) a process of inputting a road-driving video for training acquired over the V2V communication in response to the fusion sensor information for training into a detection network, to thereby allow the detection network to detect at least part of the second virtual vehicles, one or more pedestrians, and one or more lanes on a traveling road of the subject autonomous vehicle for training and thus to output nearby object information for training, (3) a process of inputting both sensor values for training, acquired over the V2V communication in response to the fusion sensor information for training, and the nearby object information for training into a drive network, to thereby allow the drive network to generate moving direction probabilities for training of said each of the m cooperatively-driving vehicles for training by referring to the sensor values for training and the nearby object information for training, and thus to drive the subject autonomous vehicle for training by referring to the moving direction probabilities for training, and (4) a process of acquiring traffic condition information for training on the subject autonomous vehicle for training driven by the drive network, a process of generating a reward by referring to the traffic condition information for training, and a process of learning the sensor fusion network by using the reward, if (i) a driving image for testing including (i-1) a subject autonomous vehicle for testing, (i-2) k cooperatively-driving vehicles for testing having first vehicles performing the cooperative driving with the subject autonomous vehicle for testing, and (i-3) second vehicles performing the non-cooperative driving, in an actual driving environment, and (ii) multiple pieces of sensor status information for testing on i sensors for testing in each of the k cooperatively-driving vehicles for testing are acquired, a testing device of at least one of the k cooperatively-driving vehicles for testing performing a process of inputting the driving image for testing and the multiple pieces of the sensor status information for testing into the sensor fusion network, to thereby allow the sensor fusion network (a-1) to generate sensor fusion probabilities for testing which are probabilities of said each of the k cooperatively-driving vehicles for testing transmitting each of sensor values of each of the i sensors for testing over the V2V communication for the cooperative driving, by applying its neural network operation to the driving image for testing and the multiple pieces of the sensor status information for testing (a-2) to generate fusion sensor information for testing on s sensors for testing having probabilities larger than a predetermined threshold among the sensor fusion probabilities for testing, and (a-3) to transmit the fusion sensor information for testing on the s sensors for testing to at least part of the k cooperatively-driving vehicles for testing over the V2V communication; and (b) the testing device of said at least one of the k cooperatively-driving vehicles for testing performing a process of inputting a road-driving video for testing acquired over the V2V communication in response to the fusion sensor information for testing into the detection network, to thereby allow the detection network to detect at least part of the second vehicles, the pedestrians, and the lanes on a driving road of the subject autonomous vehicle for testing and thus to output nearby object information for testing, and a process of inputting both sensor values for testing, acquired over the V2V communication in response to the fusion sensor information for testing, and the nearby object information for testing into the drive network, to thereby allow the drive network to generate moving direction probabilities for testing of said each of the k cooperatively-driving vehicles for testing by referring to the sensor values for testing and the nearby object information for testing, and thus to drive the subject autonomous vehicle for testing by referring to the moving direction probabilities for testing.

As one example, at the step of (a), the testing device of said at least one of the k cooperatively-driving vehicles for testing performs a process of inputting the driving image for testing and the multiple pieces of the sensor status information for testing into the sensor fusion network, to thereby allow the sensor fusion network to (i) generate a feature map for testing by applying convolution operation of a CNN to the driving image for testing and generate an image feature vector for testing by applying fully-connected operation to the feature map for testing, (ii) generate a sensor status feature vector for testing by applying recurrent neural network operation of at least one LSTM to the multiple pieces of the sensor status information for testing, and (iii) generate a concatenated feature vector for testing by concatenating the image feature vector for testing and the sensor status feature vector for testing and generate the sensor fusion probabilities for testing by applying fully-connected operation of at least one fully connected layer to the concatenated feature vector for testing.

As one example, the testing device of said at least one of the k cooperatively-driving vehicles for testing instructs the sensor fusion network to (i) allow a pooling layer to apply max-pooling operation to the feature map for testing and then (ii) apply fully-connected operation to a result of said (i), to thereby generate the image feature vector for testing.

As one example, the testing device of said at least one of the k cooperatively-driving vehicles for testing normalizes and outputs each of the sensor fusion probabilities for testing using a softmax algorithm.

As one example, at the step of (a), the testing device of said at least one of the k cooperatively-driving vehicles for testing performs (i) a process of generating a feature map for testing by applying multiple convolution operation using a specific CNN to the driving image for testing, acquired from a specific cooperatively-driving vehicle among the k cooperatively-driving vehicles for testing, and if an image feature vector for testing is generated by applying fully-connected operation to the feature map for testing, a process of acquiring the image feature vector for testing from the specific cooperatively-driving vehicle over the V2V communication, (ii) a process of generating a sensor status feature vector for testing by applying recurrent neural network operation using at least one LSTM to the multiple pieces of the sensor status information for testing, and (iii) a process of generating a concatenated feature vector for testing by concatenating the image feature vector for testing and the sensor status feature vector for testing acquired over the V2V communication and a process of generating the sensor fusion probabilities for testing by applying fully-connected operation of at least one fully connected layer to the concatenated feature vector for testing.

As one example, the specific vehicle allows a specific CNN to apply convolution operation to the driving image for testing to thereby generate a feature map for testing, and to apply fully-connected operation to the feature map for testing to thereby generate the image feature vector for testing, and wherein the specific vehicle is one of the k cooperatively-driving vehicles for testing which is designated sequentially at stated intervals according to a round-robin schedule.

In accordance with still another aspect of the present disclosure, there is provided a learning device for learning a sensor fusion network to be used for sensor fusion of an autonomous vehicle performing a cooperative driving, including: at least one memory that stores instructions; and at least one processor configured to execute the instructions to perform or support another device to perform: (I) if (i) a driving image for training including (i-1) a subject autonomous vehicle, (i-2) m cooperatively-driving vehicles for training having first virtual vehicles performing the cooperative driving with the subject autonomous vehicle, and (i-3) second virtual vehicles performing a non-cooperative driving and (ii) multiple pieces of sensor status information for training on n sensors for training in each of the m cooperatively-driving vehicles for training are acquired, a process of inputting the driving image for training and the multiple pieces of the sensor status information for training into the sensor fusion network, to thereby allow the sensor fusion network (I-1) to generate sensor fusion probabilities for training which are probabilities of said each of the m cooperatively-driving vehicles for training transmitting each of sensor values of each of the n sensors for training over V2V communication for the cooperative driving, by applying its neural network operation to the driving image for training and the multiple pieces of the sensor status information for training and (I-2) to generate fusion sensor information for training on s sensors for training having probabilities larger than a preset threshold among the sensor fusion probabilities for training wherein s is an integer ranging from 1 to m×n, (II) a process of inputting a road-driving video for training acquired over the V2V communication in response to the fusion sensor information for training into a detection network, to thereby allow the detection network to detect at least part of the second virtual vehicles, one or more pedestrians, and one or more lanes on a traveling road of the subject autonomous vehicle and thus to output nearby object information for training, and a process of inputting both sensor values for training, acquired over the V2V communication in response to the fusion sensor information for training, and the nearby object information for training into a drive network, to thereby allow the drive network to generate moving direction probabilities for training of said each of the m cooperatively-driving vehicles for training by referring to the sensor values for training and the nearby object information for training, and thus to drive the subject autonomous vehicle by referring to the moving direction probabilities for training, and (III) a process of acquiring traffic condition information for training on the subject autonomous vehicle driven by the drive network, a process of generating a reward by referring to the traffic condition information for training, and a process of learning the sensor fusion network by using the reward.

As one example, at the process of (I), the processor performs a process of inputting the driving image for training and the multiple pieces of the sensor status information for training into the sensor fusion network, to thereby allow the sensor fusion network to (i) generate a feature map for training by applying convolution operation using a CNN to the driving image for training and generate an image feature vector for training by applying fully-connected operation to the feature map for training, (ii) generate a sensor status feature vector for training by applying recurrent neural network operation using at least one LSTM to the multiple pieces of the sensor status information for training, and (iii) generate a concatenated feature vector for training by concatenating the image feature vector for training and the sensor status feature vector for training and generate the sensor fusion probabilities for training by applying fully-connected operation of at least one fully connected layer to the concatenated feature vector for training.

As one example, the processor updates at least one parameter of the CNN, the at least one LSTM, and the at least one fully connected layer which are included in the sensor fusion network, by using the reward.

As one example, the processor instructs the sensor fusion network to (i) allow a pooling layer to apply max-pooling operation to the feature map for training and then (ii) apply fully-connected operation to a result of said (i), to thereby generate the image feature vector for training.

As one example, the processor normalizes and outputs each of the sensor fusion probabilities for training using a softmax algorithm.

As one example, the reward is generated by subtracting the number of the s sensors for training from a sum of the number of the n sensors for training in each of the m cooperatively-driving vehicles for training, and wherein the processor increases or decreases the reward by referring to the traffic condition information for training.

As one example, the driving image for training is an entire road image of an entire road on which the m cooperatively-driving vehicles for training is in the cooperative driving, and is an image with m+1 channels which represents whether each of blocks of a certain size, into which the entire road image is divided as a grid, is occupied by said each of the m cooperatively-driving vehicles for training or by all of the second virtual vehicles, and wherein each of m channels among said m+1 channels corresponds to said each of the m cooperatively-driving vehicles for training, and a remaining channel among said m+1 channels corresponds to the second virtual vehicles.

In accordance with still yet another aspect of the present disclosure, there is provided a testing device of at least one of k cooperatively-driving vehicles for testing, to be used for testing a sensor fusion network to be used for sensor fusion of an autonomous vehicle performing a cooperative driving, including: at least one memory that stores instructions; and at least one processor configured to execute the instructions to perform or support another device to perform: (I) on condition that a learning device has performed, if (i) a driving image for training including (i-1) a subject autonomous vehicle for training, (i-2) m cooperatively-driving vehicles for training having first virtual vehicles performing the cooperative driving with the subject autonomous vehicle for training, and (i-3) second virtual vehicles performing a non-cooperative driving and (ii) multiple pieces of sensor status information for training on n sensors for training in each of the m cooperatively-driving vehicles for training are acquired, (1) a process of inputting the driving image for training and the multiple pieces of the sensor status information for training into the sensor fusion network, to thereby allow the sensor fusion network (1-1) to generate sensor fusion probabilities for training which are probabilities of said each of the m cooperatively-driving vehicles for training transmitting each of sensor values of each of the n sensors for training over V2V communication for the cooperative driving, by applying its neural network operation to the driving image for training and the multiple pieces of the sensor status information for training and (1-2) to generate fusion sensor information for training on s sensors for training having probabilities larger than a preset threshold among the sensor fusion probabilities for training wherein s is an integer ranging from 1 to m×n, (2) a process of inputting a road-driving video for training acquired over the V2V communication in response to the fusion sensor information for training into a detection network, to thereby allow the detection network to detect at least part of the second virtual vehicles, one or more pedestrians, and one or more lanes on a traveling road of the subject autonomous vehicle for training and thus to output nearby object information for training, (3) a process of inputting both sensor values for training, acquired over the V2V communication in response to the fusion sensor information for training, and the nearby object information for training into a drive network, to thereby allow the drive network to generate moving direction probabilities for training of said each of the m cooperatively-driving vehicles for training by referring to the sensor values for training and the nearby object information for training, and thus to drive the subject autonomous vehicle for training by referring to the moving direction probabilities for training, and (4) a process of acquiring traffic condition information for training on the subject autonomous vehicle for training driven by the drive network, a process of generating a reward by referring to the traffic condition information for training, and a process of learning the sensor fusion network by using the reward, if (i) a driving image for testing including (i-1) a subject autonomous vehicle for testing, (i-2) the k cooperatively-driving vehicles for testing having first vehicles performing the cooperative driving with the subject autonomous vehicle for testing, and (i-3) second vehicles performing the non-cooperative driving, in an actual driving environment, and (ii) multiple pieces of sensor status information for testing on i sensors for testing in each of the k cooperatively-driving vehicles for testing are acquired, a process of inputting the driving image for testing and the multiple pieces of the sensor status information for testing into the sensor fusion network, to thereby allow the sensor fusion network (I-1) to generate sensor fusion probabilities for testing which are probabilities of said each of the k cooperatively-driving vehicles for testing transmitting each of sensor values of each of the i sensors for testing over the V2V communication for the cooperative driving, by applying its neural network operation to the driving image for testing and the multiple pieces of the sensor status information for testing (I-2) to generate fusion sensor information for testing on s sensors for testing having probabilities larger than a predetermined threshold among the sensor fusion probabilities for testing, and (I-3) to transmit the fusion sensor information for testing on the s sensors for testing to at least part of the k cooperatively-driving vehicles for testing over the V2V communication, and (II) a process of inputting a road-driving video for testing acquired over the V2V communication in response to the fusion sensor information for testing into the detection network, to thereby allow the detection network to detect at least part of the second vehicles, the pedestrians, and the lanes on a driving road of the subject autonomous vehicle for testing and thus to output nearby object information for testing, and a process of inputting both sensor values for testing, acquired over the V2V communication in response to the fusion sensor information for testing, and the nearby object information for testing into the drive network, to thereby allow the drive network to generate moving direction probabilities for testing of said each of the k cooperatively-driving vehicles for testing by referring to the sensor values for testing and the nearby object information for testing, and thus to drive the subject autonomous vehicle for testing by referring to the moving direction probabilities for testing.

As one example, at the process of (I), the processor performs a process of inputting the driving image for testing and the multiple pieces of the sensor status information for testing into the sensor fusion network, to thereby allow the sensor fusion network to (i) generate a feature map for testing by applying convolution operation of a CNN to the driving image for testing and generate an image feature vector for testing by applying fully-connected operation to the feature map for testing, (ii) generate a sensor status feature vector for testing by applying recurrent neural network operation of at least one LSTM to the multiple pieces of the sensor status information for testing, and (iii) generate a concatenated feature vector for testing by concatenating the image feature vector for testing and the sensor status feature vector for testing and generate the sensor fusion probabilities for testing by applying fully-connected operation of at least one fully connected layer to the concatenated feature vector for testing.

As one example, the processor instructs the sensor fusion network to (i) allow a pooling layer to apply max-pooling operation to the feature map for testing and then (ii) apply fully-connected operation to a result of said (i), to thereby generate the image feature vector for testing.

As one example, the processor normalizes and outputs each of the sensor fusion probabilities for testing using a softmax algorithm.

As one example, at the process of (I), the processor performs (i) a process of generating a feature map for testing by applying multiple convolution operation using a specific CNN to the driving image for testing, acquired from a specific cooperatively-driving vehicle among the k cooperatively-driving vehicles for testing, and if an image feature vector for testing is generated by applying fully-connected operation to the feature map for testing, a process of acquiring the image feature vector for testing from the specific cooperatively-driving vehicle over the V2V communication, (ii) a process of generating a sensor status feature vector for testing by applying recurrent neural network operation using at least one LSTM to the multiple pieces of the sensor status information for testing, and (iii) a process of generating a concatenated feature vector for testing by concatenating the image feature vector for testing and the sensor status feature vector for testing acquired over the V2V communication and a process of generating the sensor fusion probabilities for testing by applying fully-connected operation of at least one fully connected layer to the concatenated feature vector for testing.

As one example, the specific vehicle allows a specific CNN to apply convolution operation to the driving image for testing to thereby generate a feature map for testing, and to apply fully-connected operation to the feature map for testing to thereby generate the image feature vector for testing, and wherein the specific vehicle is one of the k cooperatively-driving vehicles for testing which is designated sequentially at stated intervals according to a round-robin schedule.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
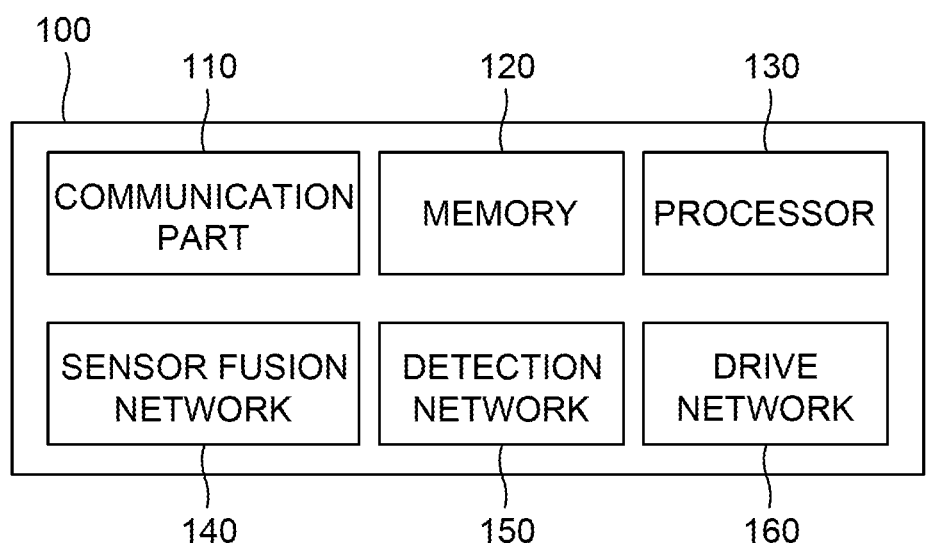
FIG. 1 is a drawing schematically illustrating a learning device for learning a sensor fusion network for sensor fusion of a subject autonomous vehicle in a cooperative driving based on a reinforcement learning in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

To allow those skilled in the art to carry out the present disclosure easily, the example embodiments of the present disclosure by referring to attached diagrams will be explained in detail as shown below.

FIG. 1 is a drawing schematically illustrating a learning device 100 for learning a sensor fusion network for multiple agent sensor fusion in a cooperative driving based on a reinforcement learning in accordance with one example embodiment of the present disclosure. By referring to FIG. 1, the learning device 100 may include a memory 120 for storing instructions to learn the sensor fusion network for the multiple agent sensor fusion in the cooperative driving of a subject autonomous vehicle based on the reinforcement learning and a processor 130 for performing processes corresponding to the instructions in the memory 120.

Specifically, the learning device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

Meanwhile, the subject autonomous vehicle may include a communication part 110 for V2V (vehicle to vehicle) communication with one or more nearby vehicles, the sensor fusion network 140 for the multiple agent sensor fusion in the cooperative driving, a detection network 150 for outputting nearby object information by detecting at least part of the nearby vehicles, one or more pedestrians, and one or more lanes on a traveling road of the subject autonomous vehicle, and a drive network 160 for allowing the subject autonomous vehicle to be driven by referring to the nearby object information and sensor values acquired over the V2V communication in response to fusion sensor information.

A method for learning the sensor fusion network for the multiple agent sensor fusion in the cooperative driving based on the reinforcement learning, by using the learning device 100 in accordance with one example of the present disclosure is described by referring to FIGS. 1 to 4.

Figure 2:
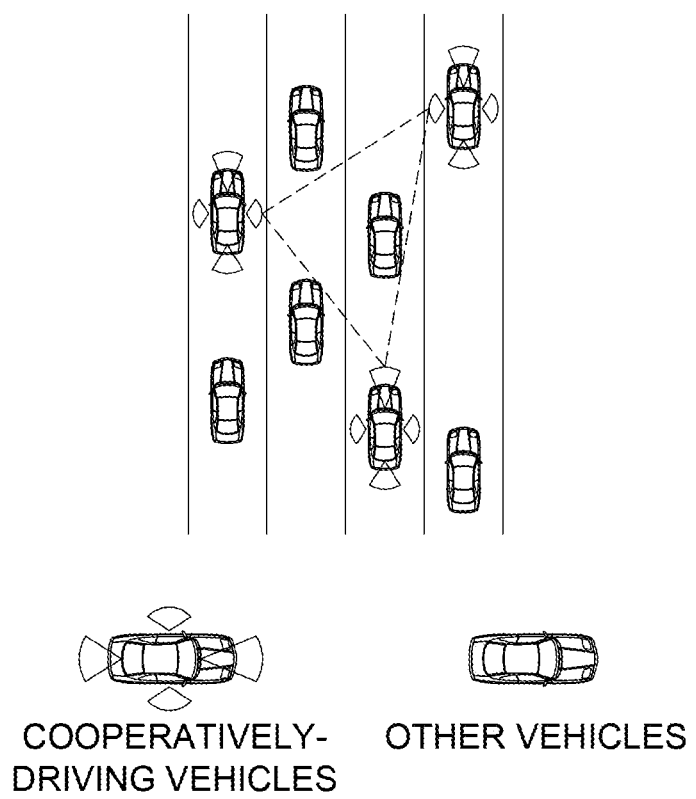
FIG. 2 is a drawing schematically illustrating a state of the cooperative driving of the subject autonomous vehicle in accordance with one example embodiment of the present disclosure.

First, by referring to FIG. 2, the learning device 100 may acquire (i) a driving image for training including (i-1) the subject autonomous vehicle, (i-2) m cooperatively-driving vehicles for training having first virtual vehicles performing the cooperative driving with the subject autonomous vehicle, and (i-3) second virtual vehicles performing a non-cooperative driving and (ii) multiple pieces of sensor status information for training on n sensors for training in each of the m cooperatively-driving vehicles for training.

Herein, in case of the subject autonomous vehicle in the cooperative driving, a learning process may have to be performed during actual driving on a road, as opposed to a process of virtual learning by a CNN (Convolutional Neural Network) for object detection where prepared training images are simply inputted. That is, in case of incomplete learning, a probability of crashes of the subject autonomous vehicle on an actual road may become very high. Therefore, in the present disclosure, the learning is performed in a virtual world to resolve the problem, and the subject autonomous vehicle and at least one nearby virtual vehicle within a certain distance from the subject autonomous vehicle may be programmed to exist in the virtual world. Herein, all agents which are the subject autonomous vehicle and the m cooperatively-driving vehicles for training including the first virtual vehicles performing the cooperative driving with the subject autonomous vehicle may determine their action over a same network.

And, FIG. 2 shows three vehicles traveling on the cooperative driving mode. But, if more than three vehicles are traveling on the cooperative driving mode, connections between them can be expressed as triangle mesh, and a simplest form of the triangle mesh is a triangle of three vehicles. Therefore, although FIG. 2 shows three vehicles, it is easily extended to include cases of multiple vehicles more than three on the cooperative driving mode.

Meanwhile, the driving image for training may be an entire road image of an entire road on which the m cooperatively-driving vehicles for training is in the cooperative driving, and may be an image with m+1 channels which represents whether each of blocks of a certain size, into which the entire road image is divided into as a grid, is occupied by said each of the m cooperatively-driving vehicles for training or by all of the second virtual vehicles, and each of m channels among said m+1 channels may correspond to said each of the m cooperatively-driving vehicles for training, and a remaining channel among said m+1 channels may correspond to the second virtual vehicles. Herein, the driving image for training may be generated by using (i) location information on the m cooperatively-driving vehicles for training that is confirmed by their own GPS information shared over the V2V communication and (ii) location information on the second virtual vehicles that is confirmed by location information on the second virtual vehicles, which are detected from previous frames by each of the m cooperatively-driving vehicles for training.

And, the multiple pieces of the sensor status information for training may represent status information on the n sensors installed on each of the m cooperatively-driving vehicles for training, that is, information on whether the sensors are operable. As an example, at least part of the multiple pieces of the sensor status information for training may be a vector representing statuses of m×n sensors where its vector component may be 1 if its corresponding sensor is operable and 0 if its corresponding sensor is inoperable due to a fault, etc. And, the multiple pieces of the sensor status information for training may further include each speed of each of the m cooperatively-driving vehicles for training. Herein, the multiple pieces of the sensor status information for training may be acquired in a virtual driving environment, by forcing the sensors to switch between a normal state and a malfunctioning state. Throughout the present specification, a "speed" may be a scalar, but may also be a vector as the case may be.

Figure 3:
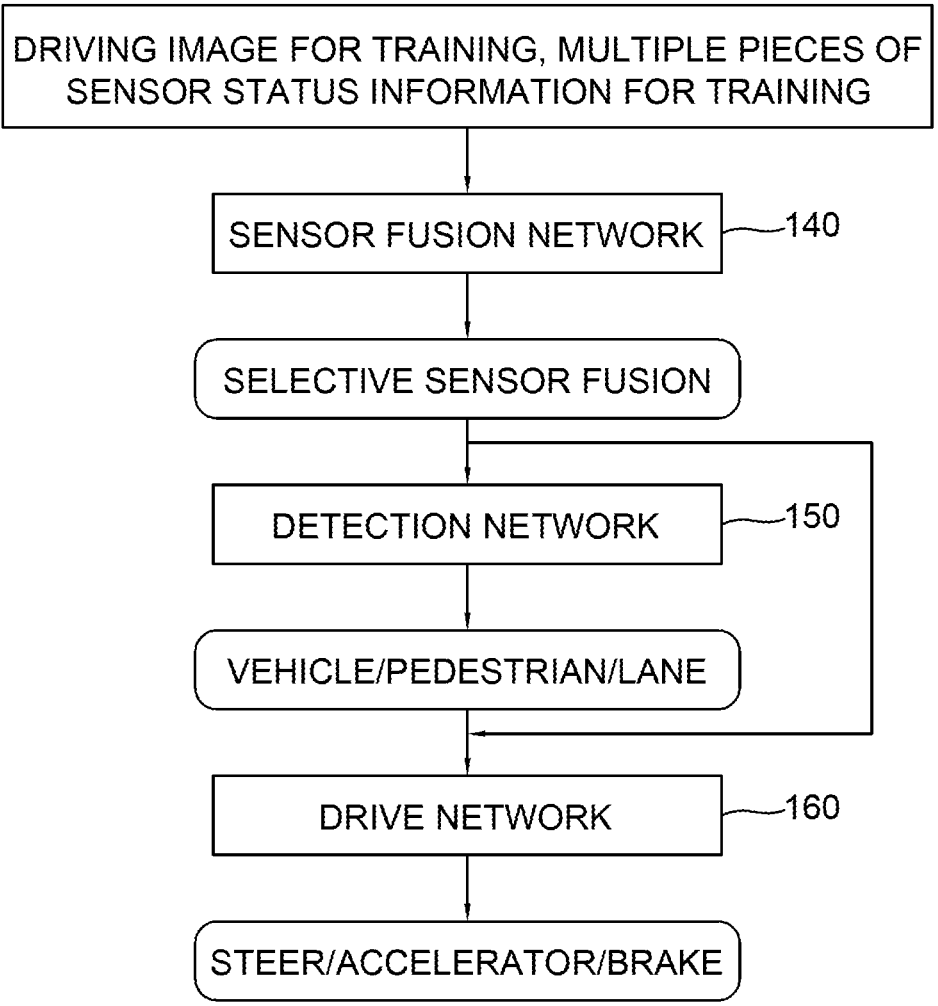
FIG. 3 is a drawing schematically illustrating a learning method for learning the sensor fusion network for the sensor fusion of the subject autonomous vehicle in the cooperative driving based on the reinforcement learning in accordance with one example embodiment of the present disclosure.

Next, by referring to FIG. 3, the learning device 100 may input the driving image for training and the multiple pieces of the sensor status information for training into the sensor fusion network 140 of the subject autonomous vehicle, to thereby allow the sensor fusion network 140 to analyze information on the sensor statuses of the m cooperatively-driving vehicles for training in the cooperative driving and information on a situation of the traveling road of the subject autonomous vehicle in the cooperative driving, to thereby output information on determination that which information from which sensor is going to be transmitted over the V2V communication to cooperatively-driving vehicles in the cooperative driving.

That is, the learning device 100 may perform a process of inputting the driving image for training and the multiple pieces of the sensor status information for training into the sensor fusion network 140, to thereby allow the sensor fusion network 140 (i) to generate sensor fusion probabilities for training which are probabilities of said each of the m cooperatively-driving vehicles for training transmitting each of the sensor values of each of the n sensors for training over the V2V communication for the cooperative driving, by applying its neural network operation to the driving image for training and the multiple pieces of the sensor status information for training and (ii) to generate the fusion sensor information for training on s sensors for training having probabilities larger than a preset threshold among the sensor fusion probabilities for training. Herein, s may be an integer larger than 0 and equal to or less than m×n.

Figure 4:
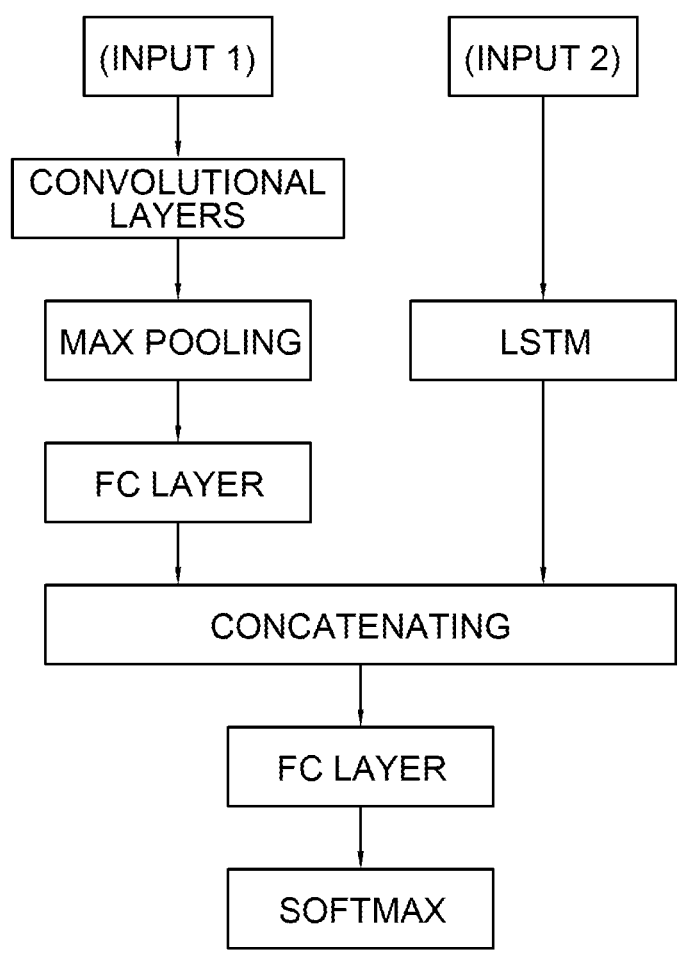
FIG. 4 is a drawing schematically illustrating the sensor fusion network for the sensor fusion of the subject autonomous vehicle in the cooperative driving based on the reinforcement learning in accordance with one example embodiment of the present disclosure.

As one example, by referring to FIG. 4, the learning device 100 may use the CNN to apply its operation to the driving image for training as an input1. That is, the learning device 100 may input the driving image for training into at least one convolutional layer and may instruct the convolutional layer to apply its at least one convolution operation to the driving image for training, to thereby generate at least one feature map for training. Herein, the convolutional layer may be comprised of multiple layers and may apply multiple convolution operations to the driving image for training.

And, the learning device 100 may input the feature map for training into at least one FC layer, to thereby allow the FC layer to apply fully-connected operation to the feature map for training and thus to generate an image feature vector for training.

Herein, the FC layer may be comprised of multiple layers. Also, the learning device 100 may allow at least one pooling layer to apply max-pooling operation to the feature map for training and may input the max-pooled feature map for training into the FC layer, as the case may be.

Also, the learning device 100 may input the multiple pieces of the sensor status information for training into at least one LSTM (long short-term memory) as an input 2, to thereby allow the LSTM to apply its recurrent neural network operation to the multiple pieces of the sensor status information for training and thus to generate the sensor status feature vector for training. Herein, the LSTM may be multiple and the LSTM may be repeated more than once.

Thereafter, the learning device 100 may generate a concatenated feature vector for training by concatenating the image feature vector for training and the sensor status feature vector for training and may input the concatenated feature vector for training into the FC layer, to thereby allow the FC layer to generate the sensor fusion probabilities for training by applying fully-connected operation to the concatenated feature vector for training. Herein the learning device 100 may allow the sensor fusion network 140 to normalize and output each of the sensor fusion probabilities for training using a softmax algorithm.

That is, the learning device 100 may allow the sensor fusion network 140 to concatenate results from the CNN and the LSTM, may input the concatenated result into the FC layer, and may apply the softmax operation onto outputs from the FC layer, to thereby generate final results, that is, outputs of the multiple agent sensor fusion.

As one example, 3×n values may be outputted which represent probabilities of each piece of the sensor information acquired from each of the sensors being transmitted over the V2V communication if each of the three vehicles on the cooperative driving mode has n sensors. Herein, n probabilities of each of the three vehicles may have been normalized beforehand per each vehicle, and in case that the sensor information acquired from each of the n sensors of the vehicles in the cooperative driving is to be transmitted over the V2V communication, top s pieces having highest probabilities may be selected.

By referring to FIG. 3 again, the learning device 100 may perform a process of inputting a road-driving video for training acquired over the V2V communication in response to the fusion sensor information for training into the detection network 150, to thereby allow the detection network 150 to detect at least part of the second virtual vehicles, the pedestrian, and the lane on the traveling road of the subject autonomous vehicle and thus to output the nearby object information for training. Herein, the detection network 150 may have been learned to detect objects on an input image.

Next, the learning device 100 may perform a process of inputting both the sensor values for training, acquired over the V2V communication in response to the fusion sensor information for training, and the nearby object information for training into the drive network 160, to thereby allow the drive network 160 to generate moving direction probabilities for training of said each of the m cooperatively-driving vehicles for training by referring to the sensor values for training and the nearby object information for training, and thus to drive the subject autonomous vehicle by referring to the moving direction probabilities for training. Herein, the drive network 160 may have been learned to generate the moving direction probabilities of the subject autonomous vehicle in the cooperative driving by referring to the sensor values and the nearby object information.

That is, the learning device 100 may allow the drive network 160 to determine how a cooperative driving formation should be changed by using the sensor values for training and the nearby object information for training. As one example, in case each of the cooperatively-driving vehicles is to move to the left or right or not, 3×m values representing probabilities of each of the cases may be outputted. Herein, three probabilities may have been normalized per each of the cooperatively-driving vehicles beforehand, and each action with a highest probability may be performed by each of the cooperatively-driving vehicles.

Next, the learning device 100 may perform a process of acquiring traffic condition information for training on the subject autonomous vehicle driven by the drive network 160, a process of generating a reward by referring to the traffic condition information for training, and a process of learning the sensor fusion network by using the reward.

That is, the learning device 100 may update at least one parameter of the CNN, the LSTM, and the fully connected layer which are included in the sensor fusion network 140, by using the reward.

Herein, the reward may be generated by subtracting the number of the s sensors for training from a sum of the number of the n sensors for training in each of the m cooperatively-driving vehicles for training, and the learning device 100 may increase or decrease the reward by referring to the traffic condition information for training.

This process is described in more detail as follows.

The subject autonomous vehicle may acquire the traffic condition information, i.e., the circumstance data, representing at least one change in a circumstance of the subject autonomous vehicle in operation. The circumstance data may include at least part of (i) information on whether at least one vehicle horn of at least one nearby vehicle within a certain distance from the subject autonomous vehicle is in use, (ii) information on a change in a velocity of said at least one nearby vehicle, and (iii) information on at least one accident between the subject autonomous vehicle and said at least one nearby vehicle. The learning device 100 or the drive network 160 may generate the reward by referring to the traffic condition information, and this means adjusting the processes by referring to such information since the reward takes part in adjusting one or more parameters of the neural network operation.

The information on use of the horns, the change in the velocity, and the accidents may be criteria for determining whether the subject autonomous vehicle is being driven safely. That is because, if the subject autonomous vehicle is being driven safely, the nearby vehicles will not sound their horns, will not reduce their speed, and will not collide with the subject autonomous vehicle. If at least one incident like sounding horns, speed reduction, and car crashes occurs, the learning device 100 or the drive network 160 may lower the reward to force the subject autonomous vehicle to drive more safely. Also, if s is the number of the sensors having its probability equal to or greater than the preset threshold so that a less number of the sensors are selected in the multiple agent sensor fusion, the learning device 100 or the drive network 160 may generate the reward by using s. As an example, the reward may be generated by subtracting the number of the s sensors for training from the sum of the number of the n sensors for training in each of the m cooperatively-driving vehicles for training.

Herein, the learning device 100 may learn the sensor fusion network 140 such that the fusion sensor information for training includes more sensors if the reward is low and may learn the sensor fusion network 140 such that the fusion sensor information for training includes less sensors if the reward is high, to thereby allow the subject autonomous vehicle to be driven more safely.

And for acquisition of the traffic condition information, logic of the nearby virtual vehicles sounding their horns and reducing their speed must be programmed in advance. Specifically, the virtual world may be programmed to (i) make at least one nearby vehicle within a certain distance from the subject autonomous vehicle in the virtual world generate its horn if the nearby vehicle is detected as having a possibility of collision with the subject autonomous vehicle within a first threshold time, and (ii) make the nearby vehicle reduce its speed if the nearby vehicle is detected as having a possibility of collision with the subject autonomous vehicle within a second threshold time. Herein, the first threshold time may be equal to or greater than the second threshold time, because a driver will sound the horn to avoid reducing the speed of his or her own vehicle. Apparently, this is just one of example embodiments, and the first threshold time and the second threshold time may be set arbitrarily.

If the logic for the nearby virtual vehicles is implemented as such, the traffic condition information may be acquired similarly to that of real-world cases. The subject autonomous vehicle may be implemented in the virtual world as such, and may be learned by adjusting the parameters of the neural network operation during a process of driving the subject autonomous vehicle in the virtual world. Upon implementation of the learning processes as above, environments similar to the real-world cases may be implemented in the virtual world, therefore a safe learning without any accidents, a traffic jam, driving on a winding road or on a road on hills, etc. may be performed for various situations in the virtual world.

Figure 5:
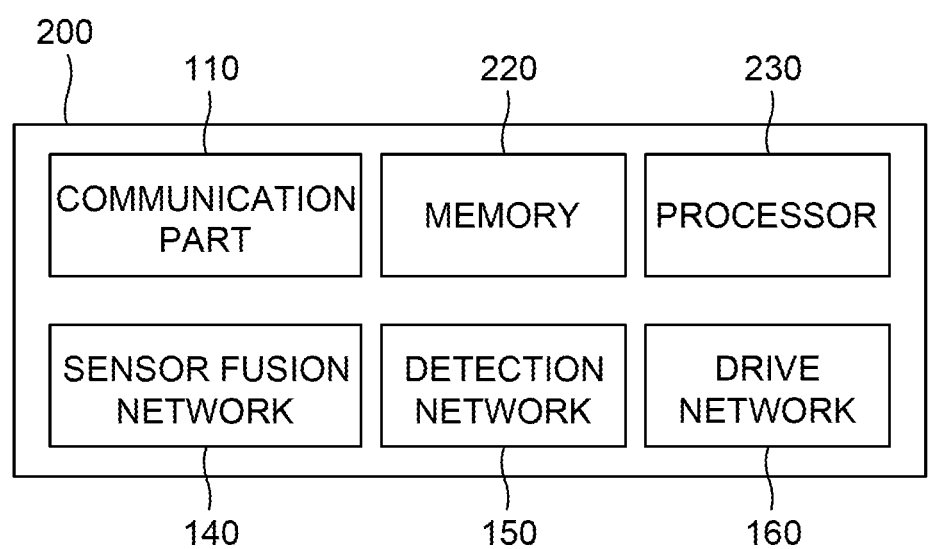
FIG. 5 is a drawing schematically illustrating a testing device for testing the sensor fusion network for the sensor fusion of the subject autonomous vehicle in the cooperative driving based on the reinforcement learning in accordance with one example embodiment of the present disclosure.

FIG. 5 is a drawing schematically illustrating a testing device for testing the sensor fusion network to be used for the sensor fusion of the autonomous vehicle in the cooperative driving based on the reinforcement learning in accordance with one example embodiment of the present disclosure. The testing device 200 may include a memory 220 for storing instructions to test the sensor fusion network for the multiple agent sensor fusion in the cooperative driving of the autonomous vehicle based on the reinforcement learning and a processor 230 for performing processes corresponding to the instructions in the memory 220.

Specifically, the testing device 200 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

A method for testing the sensor fusion network for the multiple agent sensor fusion in the cooperative driving based on the reinforcement learning, by using the testing device 200 in accordance with one example of the present disclosure is described as follows. In the description below, the part easily deducible from the explanation of FIGS. 2 to 4 will be omitted.

First, the sensor fusion network for the sensor fusion of the subject autonomous vehicle may have been learned based on the reinforcement learning as in the description above.

That is, the sensor fusion network may have been learned by the learning device performing, (a) if (i) the driving image for training including (i-1) the subject autonomous vehicle, (i-2) the m cooperatively-driving vehicles for training having the first virtual vehicles performing the cooperative driving with the subject autonomous vehicle, and (i-3) the second virtual vehicles performing the non-cooperative driving, in the virtual driving environment, and (ii) the multiple pieces of the sensor status information for training on the n sensors for training in each of the m cooperatively-driving vehicles for training are acquired, a process of inputting the driving image for training and the multiple pieces of the sensor status information for training into the sensor fusion network 140, to thereby allow the sensor fusion network 140 (i) to generate the sensor fusion probabilities for training which are probabilities of said each of the m cooperatively-driving vehicles for training transmitting each of sensor values of each of the n sensors for training over the V2V communication for the cooperative driving, by applying its neural network operation to the driving image for training and the multiple pieces of the sensor status information for training and (ii) to generate the fusion sensor information for training on the s sensors for training having probabilities larger than the preset threshold among the sensor fusion probabilities for training, (b) a process of inputting the road-driving video for training acquired over the V2V communication in response to the fusion sensor information for training into the detection network, to thereby allow the detection network to detect at least part of the second virtual vehicles, the pedestrian, and the lane on the traveling road of the subject autonomous vehicle and thus to output the nearby object information for training, and a process of inputting both the sensor values for training, acquired over the V2V communication in response to the fusion sensor information for training, and the nearby object information for training into the drive network, to thereby allow the drive network to generate the moving direction probabilities for training of said each of the m cooperatively-driving vehicles for training by referring to the sensor values for training and the nearby object information for training, and thus to drive the subject autonomous vehicle by referring to the moving direction probabilities for training, and (c) a process of acquiring the traffic condition information for training on the subject autonomous vehicle driven by the drive network, a process of generating the reward by referring to the traffic condition information for training, and a process of learning the sensor fusion network by using the reward.

Then, if (i) a driving image for testing including (i-1) the subject autonomous vehicle, (i-2) k cooperatively-driving vehicles for testing having first vehicles performing the cooperative driving with the subject autonomous vehicle, and (i-3) second vehicles performing the non-cooperative driving, in an actual driving environment, and (ii) multiple pieces of sensor status information for testing on i sensors for testing in each of the k cooperatively-driving vehicles for testing are acquired, a testing device 200 of at least one of the k cooperatively-driving vehicles for testing may perform a process of inputting the driving image for testing and the multiple pieces of the sensor status information for testing into the sensor fusion network, to thereby allow the sensor fusion network (i) to generate sensor fusion probabilities for testing which are probabilities of said each of the k cooperatively-driving vehicles for testing transmitting each of sensor values of each of the i sensors for testing over the V2V communication for the cooperative driving, by applying its neural network operation to the driving image for testing and the multiple pieces of the sensor status information for testing (ii) to generate fusion sensor information for testing on s sensors for testing having probabilities larger than the preset threshold among the sensor fusion probabilities for testing, and (iii) to transmit the fusion sensor information for testing on the s sensors for testing to at least part of the k cooperatively-driving vehicles for testing over the V2V communication.

That is, the testing device 200 of said at least one of the k cooperatively-driving vehicles for testing may perform a process of inputting the driving image for testing and the multiple pieces of the sensor status information for testing into the sensor fusion network 140, to thereby allow the sensor fusion network 140 to (i) generate a feature map for testing by applying convolution operation using the CNN to the driving image for testing and generate an image feature vector for testing by applying fully-connected operation to the feature map for testing, (ii) generate a sensor status feature vector for testing by applying recurrent neural network operation using at least one LSTM to the multiple pieces of the sensor status information for testing, and (iii) generate a concatenated feature vector for testing by concatenating the image feature vector for testing and the sensor status feature vector for testing and generate the sensor fusion probabilities for testing by applying fully-connected operation of at least one fully connected layer to the concatenated feature vector for testing.

As one example, the testing device 200 may use the CNN to apply its operation to the driving image for testing as an input1. That is, the testing device 200 may input the driving image for testing into the convolutional layer and may instruct the convolutional layer to apply its convolution operation to the driving image for testing, to thereby generate the feature map for testing.

And, the testing device 200 may input the feature map for testing into the FC layer, to thereby allow the FC layer to apply fully-connected operation to the feature map for testing and thus to generate an image feature vector for testing.

Also, the testing device 200 may input the multiple pieces of the sensor status information for testing into the LSTM (long short-term memory) as an input 2, to thereby allow the LSTM to apply its recurrent neural network operation to the multiple pieces of the sensor status information for testing and thus to generate the sensor status feature vector for testing.

Thereafter, the testing device 200 may generate a concatenated feature vector for testing by concatenating the image feature vector for testing and the sensor status feature vector for testing and may input the concatenated feature vector for testing into the FC layer, to thereby allow the FC layer to generate the sensor fusion probabilities for testing by applying fully-connected operation to the concatenated feature vector for testing.

Next, the testing device 200 of said at least one of the k cooperatively-driving vehicles for testing may perform a process of inputting a road-driving video for testing acquired over the V2V communication in response to the fusion sensor information for testing into the detection network 150, to thereby allow the detection network 150 to detect at least part of the second vehicles, the pedestrian, and the lane on an actual traveling road of the subject autonomous vehicle and thus to output nearby object information for testing.

Thereafter, the testing device 200 may perform a process of inputting both sensor values for testing, acquired over the V2V communication in response to the fusion sensor information for testing, and the nearby object information for testing into the drive network 160, to thereby allow the drive network 160 to generate moving direction probabilities for testing of said each of the k cooperatively-driving vehicles for testing by referring to the sensor values for testing and the nearby object information for testing, and thus to drive the subject autonomous vehicle by referring to the moving direction probabilities for testing.

Meanwhile, if the testing device 200 performs a network operation in a centralized form, a single agent may receive the driving image for testing and the multiple pieces of the sensor status information for testing from all agents, i.e., the k cooperatively-driving vehicles for testing, over the V2V communication as in a form of gather, i.e., all-to-one, and the single agent may perform the calculation and transmit its result as V2V broadcasting, i.e., one-to-all.

Also, if at least part of the network operation is divided for distributive processing, all agents may perform the network operation of the LSTM part whose computational load is light, a specific agent among all the agents may perform the network operation of the CNN part whose computational load is heavy and may broadcast its intermediate result over the V2V communication, and all the agents may perform the part of aggregating the intermediate results of the LSTM and the CNN and the part of computing a final result. Therefore, the specific agent handles the CNN part with heavy load, and all the agents handle the heavy load in round robin, thus average load may be reduced.

That is, if a specific vehicle among the k cooperatively-driving vehicles for testing allows a specific CNN to apply multiple convolution operations to the driving image for testing to thereby generate the feature map for testing, and to apply fully-connected operation to the feature map for testing to thereby generate the image feature vector for testing, then the testing device 200 of said at least one of the k cooperatively-driving vehicles for testing may acquire the image feature vector for testing from said at least one of the k cooperatively-driving vehicles for testing over the V2V communication. And, the testing device 200 may allow at least one LSTM to apply its recurrent neural network operation to the multiple pieces of the sensor status information for testing and thus to generate the sensor status feature vector for testing. Thereafter, the testing device 200 may generate the concatenated feature vector for testing by concatenating the image feature vector for testing and the sensor status feature vector for testing acquired over the V2V communication and may allow at least one FC layer to generate the sensor fusion probabilities for testing by applying fully-connected operation to the concatenated feature vector for testing.

Herein, the specific vehicle which allows the specific CNN to apply convolution operation to the driving image for testing to thereby generate the feature map for testing, and to apply fully-connected operation to the feature map for testing to thereby generate the image feature vector for testing may be one of the k cooperatively-driving vehicles for testing which is designated sequentially at stated intervals according to a round-robin schedule.

In accordance with the present disclosure, autonomous vehicles based on the multiple agent reinforcement learning, operating in the cooperative driving mode, may select which piece of the sensor information should be transmitted to one another over the V2V communication and may determine how the cooperative driving formation of at least part of all of the autonomous vehicles in the cooperative driving mode should be changed, according to the situation of the traveling road and one or more sensor statuses of the autonomous vehicles, and may perform autonomous driving by using sensor information through one of V2V information fusion and the multiple agent sensor fusion, and may re-position themselves to optimal locations for the cooperative driving, and if part of their own sensors is inoperable, may utilize the sensor information from other autonomous vehicles on the cooperative driving mode, to thereby allow a functional safety. And, a reliability of the autonomous vehicles may be updated by training from virtual driving.

The present disclosure has an effect of improving the reliability of an autonomous vehicle because even if part of the sensors of the autonomous vehicle is inoperable, the sensor information from other autonomous vehicles on the cooperative driving mode can be utilized.

The present disclosure has another effect of minimizing transmitted/received amount of data by only transmitting/receiving sensor information necessary over the V2V communication.

The present disclosure has still another effect of acquiring accurate sensor information required for proper positioning of the autonomous vehicle for the cooperative driving.

The present disclosure has still yet another effect of reducing computational load of the autonomous vehicle by sharing common sensor information with distributive computation among all of the autonomous vehicles by the cooperative driving.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for learning a sensor fusion network to be used for sensor fusion of an autonomous vehicle performing a cooperative driving, comprising steps of:
(a) if (i) a driving image for training including (i-1) a subject autonomous vehicle, (i-2) m cooperatively-driving vehicles for training having first virtual vehicles performing the cooperative driving with the subject autonomous vehicle, and (i-3) second virtual vehicles performing a non-cooperative driving and (ii) multiple pieces of sensor status information for training on n sensors for training in each of the m cooperatively-driving vehicles for training are acquired, a learning device performing a process of inputting the driving image for training and the multiple pieces of the sensor status information for training into the sensor fusion network, to thereby allow the sensor fusion network (a-1) to generate sensor fusion probabilities for training which are probabilities of said each of the m cooperatively-driving vehicles for training transmitting each of sensor values of each of the n sensors for training over V2V communication for the cooperative driving, by applying its neural network operation to the driving image for training and the multiple pieces of the sensor status information for training and (a-2) to generate fusion sensor information for training on s sensors for training having probabilities larger than a preset threshold among the sensor fusion probabilities for training wherein s is an integer ranging from 1 to m×n;
(b) the learning device performing a process of inputting a road-driving video for training acquired over the V2V communication in response to the fusion sensor information for training into a detection network, to thereby allow the detection network to detect at least part of the second virtual vehicles, one or more pedestrians, and one or more lanes on a traveling road of the subject autonomous vehicle and thus to output nearby object information for training, and a process of inputting both sensor values for training, acquired over the V2V communication in response to the fusion sensor information for training, and the nearby object information for training into a drive network, to thereby allow the drive network to generate moving direction probabilities for training of said each of the m cooperatively-driving vehicles for training by referring to the sensor values for training and the nearby object information for training, and thus to drive the subject autonomous vehicle by referring to the moving direction probabilities for training; and
(c) the learning device performing a process of acquiring traffic condition information for training on the subject autonomous vehicle driven by the drive network, a process of generating a reward by referring to the traffic condition information for training, and a process of learning the sensor fusion network by using the reward.

2. The method of claim 1, wherein, at the step of (a), the learning device performs a process of inputting the driving image for training and the multiple pieces of the sensor status information for training into the sensor fusion network, to thereby allow the sensor fusion network to (i) generate a feature map for training by applying convolution operation using a CNN to the driving image for training and generate an image feature vector for training by applying fully-connected operation to the feature map for training, (ii) generate a sensor status feature vector for training by applying recurrent neural network operation using at least one LSTM to the multiple pieces of the sensor status information for training, and (iii) generate a concatenated feature vector for training by concatenating the image feature vector for training and the sensor status feature vector for training and generate the sensor fusion probabilities for training by applying fully-connected operation of at least one fully connected layer to the concatenated feature vector for training.

3. The method of claim 2, wherein the learning device updates at least one parameter of the CNN, the at least one LSTM, and the at least one fully connected layer which are included in the sensor fusion network, by using the reward.

4. The method of claim 2, wherein the learning device instructs the sensor fusion network to (i) allow a pooling layer to apply max-pooling operation to the feature map for training and then (ii) apply fully-connected operation to a result of said (i), to thereby generate the image feature vector for training.

5. The method of claim 2, wherein the learning device normalizes and outputs each of the sensor fusion probabilities for training using a softmax algorithm.

6. The method of claim 1, wherein the reward is generated by subtracting the number of the s sensors for training from a sum of the number of the n sensors for training in each of the m cooperatively-driving vehicles for training, and
wherein the learning device increases or decreases the reward by referring to the traffic condition information for training.

7. The method of claim 1, wherein the driving image for training is an entire road image of an entire road on which the m cooperatively-driving vehicles for training is in the cooperative driving, and is an image with m+1 channels which represents whether each of blocks of a certain size, into which the entire road image is divided as a grid, is occupied by said each of the m cooperatively-driving vehicles for training or by all of the second virtual vehicles, and wherein each of m channels among said m+1 channels corresponds to said each of the m cooperatively-driving vehicles for training, and a remaining channel among said m+1 channels corresponds to the second virtual vehicles.

8. A method for testing a sensor fusion network to be used for sensor fusion of an autonomous vehicle performing a cooperative driving, comprising steps of:
(a) on condition that a learning device has performed, if (i) a driving image for training including (i-1) a subject autonomous vehicle for training, (i-2) m cooperatively-driving vehicles for training having first virtual vehicles performing the cooperative driving with the subject autonomous vehicle for training, and (i-3) second virtual vehicles performing a non-cooperative driving and (ii) multiple pieces of sensor status information for training on n sensors for training in each of the m cooperatively-driving vehicles for training are acquired, (1) a process of inputting the driving image for training and the multiple pieces of the sensor status information for training into the sensor fusion network, to thereby allow the sensor fusion network (1-1) to generate sensor fusion probabilities for training which are probabilities of said each of the m cooperatively-driving vehicles for training transmitting each of sensor values of each of the n sensors for training over V2V communication for the cooperative driving, by applying its neural network operation to the driving image for training and the multiple pieces of the sensor status information for training and (1-2) to generate fusion sensor information for training on s sensors for training having probabilities larger than a preset threshold among the sensor fusion probabilities for training wherein s is an integer ranging from 1 to m×n, (2) a process of inputting a road-driving video for training acquired over the V2V communication in response to the fusion sensor information for training into a detection network, to thereby allow the detection network to detect at least part of the second virtual vehicles, one or more pedestrians, and one or more lanes on a traveling road of the subject autonomous vehicle for training and thus to output nearby object information for training, (3) a process of inputting both sensor values for training, acquired over the V2V communication in response to the fusion sensor information for training, and the nearby object information for training into a drive network, to thereby allow the drive network to generate moving direction probabilities for training of said each of the m cooperatively-driving vehicles for training by referring to the sensor values for training and the nearby object information for training, and thus to drive the subject autonomous vehicle for training by referring to the moving direction probabilities for training, and (4) a process of acquiring traffic condition information for training on the subject autonomous vehicle for training driven by the drive network, a process of generating a reward by referring to the traffic condition information for training, and a process of learning the sensor fusion network by using the reward, if (i) a driving image for testing including (i-1) a subject autonomous vehicle for testing, (i-2) k cooperatively-driving vehicles for testing having first vehicles performing the cooperative driving with the subject autonomous vehicle for testing, and (i-3) second vehicles performing the non-cooperative driving, in an actual driving environment, and (ii) multiple pieces of sensor status information for testing on i sensors for testing in each of the k cooperatively-driving vehicles for testing are acquired, a testing device of at least one of the k cooperatively-driving vehicles for testing performing a process of inputting the driving image for testing and the multiple pieces of the sensor status information for testing into the sensor fusion network, to thereby allow the sensor fusion network (a-1) to generate sensor fusion probabilities for testing which are probabilities of said each of the k cooperatively-driving vehicles for testing transmitting each of sensor values of each of the i sensors for testing over the V2V communication for the cooperative driving, by applying its neural network operation to the driving image for testing and the multiple pieces of the sensor status information for testing (a-2) to generate fusion sensor information for testing on s sensors for testing having probabilities larger than a predetermined threshold among the sensor fusion probabilities for testing, and (a-3) to transmit the fusion sensor information for testing on the s sensors for testing to at least part of the k cooperatively-driving vehicles for testing over the V2V communication; and (b) the testing device of said at least one of the k cooperatively-driving vehicles for testing performing a process of inputting a road-driving video for testing acquired over the V2V communication in response to the fusion sensor information for testing into the detection network, to thereby allow the detection network to detect at least part of the second vehicles, the pedestrians, and the lanes on a driving road of the subject autonomous vehicle for testing and thus to output nearby object information for testing, and a process of inputting both sensor values for testing, acquired over the V2V communication in response to the fusion sensor information for testing, and the nearby object information for testing into the drive network, to thereby allow the drive network to generate moving direction probabilities for testing of said each of the k cooperatively-driving vehicles for testing by referring to the sensor values for testing and the nearby object information for testing, and thus to drive the subject autonomous vehicle for testing by referring to the moving direction probabilities for testing.

9. The method of claim 8, wherein, at the step of (a), the testing device of said at least one of the k cooperatively-driving vehicles for testing performs a process of inputting the driving image for testing and the multiple pieces of the sensor status information for testing into the sensor fusion network, to thereby allow the sensor fusion network to (i) generate a feature map for testing by applying convolution operation of a CNN to the driving image for testing and generate an image feature vector for testing by applying fully-connected operation to the feature map for testing, (ii) generate a sensor status feature vector for testing by applying recurrent neural network operation of at least one LSTM to the multiple pieces of the sensor status information for testing, and (iii) generate a concatenated feature vector for testing by concatenating the image feature vector for testing and the sensor status feature vector for testing and generate the sensor fusion probabilities for testing by applying fully-connected operation of at least one fully connected layer to the concatenated feature vector for testing.

10. The method of claim 9, wherein the testing device of said at least one of the k cooperatively-driving vehicles for testing instructs the sensor fusion network to (i) allow a pooling layer to apply max-pooling operation to the feature map for testing and then (ii) apply fully-connected operation to a result of said (i), to thereby generate the image feature vector for testing.

11. The method of claim 9, wherein the testing device of said at least one of the k cooperatively-driving vehicles for testing normalizes and outputs each of the sensor fusion probabilities for testing using a softmax algorithm.

12. The method of claim 8, wherein, at the step of (a), the testing device of said at least one of the k cooperatively-driving vehicles for testing performs (i) a process of generating a feature map for testing by applying multiple convolution operation using a specific CNN to the driving image for testing, acquired from a specific cooperatively-driving vehicle among the k cooperatively-driving vehicles for testing, and if an image feature vector for testing is generated by applying fully-connected operation to the feature map for testing, a process of acquiring the image feature vector for testing from the specific cooperatively-driving vehicle over the V2V communication, (ii) a process of generating a sensor status feature vector for testing by applying recurrent neural network operation using at least one LSTM to the multiple pieces of the sensor status information for testing, and (iii) a process of generating a concatenated feature vector for testing by concatenating the image feature vector for testing and the sensor status feature vector for testing acquired over the V2V communication and a process of generating the sensor fusion probabilities for testing by applying fully-connected operation of at least one fully connected layer to the concatenated feature vector for testing.

13. The method of claim 12, wherein the specific vehicle allows a specific CNN to apply convolution operation to the driving image for testing to thereby generate a feature map for testing, and to apply fully-connected operation to the feature map for testing to thereby generate the image feature vector for testing, and wherein the specific vehicle is one of the k cooperatively-driving vehicles for testing which is designated sequentially at stated intervals according to a round-robin schedule.

14. A learning device for learning a sensor fusion network to be used for sensor fusion of an autonomous vehicle performing a cooperative driving, comprising:
at least one memory that stores instructions; and
at least one processor configured to execute the instructions to perform or support another device to perform: (I) if (i) a driving image for training including (i-1) a subject autonomous vehicle, (i-2) m cooperatively-driving vehicles for training having first virtual vehicles performing the cooperative driving with the subject autonomous vehicle, and (i-3) second virtual vehicles performing a non-cooperative driving and (ii) multiple pieces of sensor status information for training on n sensors for training in each of the m cooperatively-driving vehicles for training are acquired, a process of inputting the driving image for training and the multiple pieces of the sensor status information for training into the sensor fusion network, to thereby allow the sensor fusion network (I-1) to generate sensor fusion probabilities for training which are probabilities of said each of the m cooperatively-driving vehicles for training transmitting each of sensor values of each of the n sensors for training over V2V communication for the cooperative driving, by applying its neural network operation to the driving image for training and the multiple pieces of the sensor status information for training and (I-2) to generate fusion sensor information for training on s sensors for training having probabilities larger than a preset threshold among the sensor fusion probabilities for training wherein s is an integer ranging from 1 to m×n, (II) a process of inputting a road-driving video for training acquired over the V2V communication in response to the fusion sensor information for training into a detection network, to thereby allow the detection network to detect at least part of the second virtual vehicles, one or more pedestrians, and one or more lanes on a traveling road of the subject autonomous vehicle and thus to output nearby object information for training, and a process of inputting both sensor values for training, acquired over the V2V communication in response to the fusion sensor information for training, and the nearby object information for training into a drive network, to thereby allow the drive network to generate moving direction probabilities for training of said each of the m cooperatively-driving vehicles for training by referring to the sensor values for training and the nearby object information for training, and thus to drive the subject autonomous vehicle by referring to the moving direction probabilities for training, and (III) a process of acquiring traffic condition information for training on the subject autonomous vehicle driven by the drive network, a process of generating a reward by referring to the traffic condition information for training, and a process of learning the sensor fusion network by using the reward.

15. The learning device of claim 14, wherein, at the process of (I), the processor performs a process of inputting the driving image for training and the multiple pieces of the sensor status information for training into the sensor fusion network, to thereby allow the sensor fusion network to (i) generate a feature map for training by applying convolution operation using a CNN to the driving image for training and generate an image feature vector for training by applying fully-connected operation to the feature map for training, (ii) generate a sensor status feature vector for training by applying recurrent neural network operation using at least one LSTM to the multiple pieces of the sensor status information for training, and (iii) generate a concatenated feature vector for training by concatenating the image feature vector for training and the sensor status feature vector for training and generate the sensor fusion probabilities for training by applying fully-connected operation of at least one fully connected layer to the concatenated feature vector for training.

16. The learning device of claim 15, wherein the processor updates at least one parameter of the CNN, the at least one LSTM, and the at least one fully connected layer which are included in the sensor fusion network, by using the reward.

17. The learning device of claim 15, wherein the processor instructs the sensor fusion network to (i) allow a pooling layer to apply max-pooling operation to the feature map for training and then (ii) apply fully-connected operation to a result of said (i), to thereby generate the image feature vector for training.

18. The learning device of claim 15, wherein the processor normalizes and outputs each of the sensor fusion probabilities for training using a softmax algorithm.

19. The learning device of claim 14, wherein the reward is generated by subtracting the number of the s sensors for training from a sum of the number of the n sensors for training in each of the m cooperatively-driving vehicles for training, and
wherein the processor increases or decreases the reward by referring to the traffic condition information for training.

20. The learning device of claim 14, wherein the driving image for training is an entire road image of an entire road on which the m cooperatively-driving vehicles for training is in the cooperative driving, and is an image with m+1 channels which represents whether each of blocks of a certain size, into which the entire road image is divided as a grid, is occupied by said each of the m cooperatively-driving vehicles for training or by all of the second virtual vehicles, and wherein each of m channels among said m+1 channels corresponds to said each of the m cooperatively-driving vehicles for training, and a remaining channel among said m+1 channels corresponds to the second virtual vehicles.

21. A testing device of at least one of k cooperatively-driving vehicles for testing, to be used for testing a sensor fusion network to be used for sensor fusion of an autonomous vehicle performing a cooperative driving, comprising:
at least one memory that stores instructions; and
at least one processor configured to execute the instructions to perform or support another device to perform: (I) on condition that a learning device has performed, if (i) a driving image for training including (i-1) a subject autonomous vehicle for training, (i-2) m cooperatively-driving vehicles for training having first virtual vehicles performing the cooperative driving with the subject autonomous vehicle for training, and (i-3) second virtual vehicles performing a non-cooperative driving and (ii) multiple pieces of sensor status information for training on n sensors for training in each of the m cooperatively-driving vehicles for training are acquired, (1) a process of inputting the driving image for training and the multiple pieces of the sensor status information for training into the sensor fusion network, to thereby allow the sensor fusion network (1-1) to generate sensor fusion probabilities for training which are probabilities of said each of the m cooperatively-driving vehicles for training transmitting each of sensor values of each of the n sensors for training over V2V communication for the cooperative driving, by applying its neural network operation to the driving image for training and the multiple pieces of the sensor status information for training and (1-2) to generate fusion sensor information for training on s sensors for training having probabilities larger than a preset threshold among the sensor fusion probabilities for training wherein s is an integer ranging from 1 to m×n, (2) a process of inputting a road-driving video for training acquired over the V2V communication in response to the fusion sensor information for training into a detection network, to thereby allow the detection network to detect at least part of the second virtual vehicles, one or more pedestrians, and one or more lanes on a traveling road of the subject autonomous vehicle for training and thus to output nearby object information for training, (3) a process of inputting both sensor values for training, acquired over the V2V communication in response to the fusion sensor information for training, and the nearby object information for training into a drive network, to thereby allow the drive network to generate moving direction probabilities for training of said each of the m cooperatively-driving vehicles for training by referring to the sensor values for training and the nearby object information for training, and thus to drive the subject autonomous vehicle for training by referring to the moving direction probabilities for training, and (4) a process of acquiring traffic condition information for training on the subject autonomous vehicle for training driven by the drive network, a process of generating a reward by referring to the traffic condition information for training, and a process of learning the sensor fusion network by using the reward, if (i) a driving image for testing including (i-1) a subject autonomous vehicle for testing, (i-2) the k cooperatively-driving vehicles for testing having first vehicles performing the cooperative driving with the subject autonomous vehicle for testing, and (i-3) second vehicles performing the non-cooperative driving, in an actual driving environment, and (ii) multiple pieces of sensor status information for testing on i sensors for testing in each of the k cooperatively-driving vehicles for testing are acquired, a process of inputting the driving image for testing and the multiple pieces of the sensor status information for testing into the sensor fusion network, to thereby allow the sensor fusion network (I-1) to generate sensor fusion probabilities for testing which are probabilities of said each of the k cooperatively-driving vehicles for testing transmitting each of sensor values of each of the i sensors for testing over the V2V communication for the cooperative driving, by applying its neural network operation to the driving image for testing and the multiple pieces of the sensor status information for testing (I-2) to generate fusion sensor information for testing on s sensors for testing having probabilities larger than a predetermined threshold among the sensor fusion probabilities for testing, and (I-3) to transmit the fusion sensor information for testing on the s sensors for testing to at least part of the k cooperatively-driving vehicles for testing over the V2V communication, and (II) a process of inputting a road-driving video for testing acquired over the V2V communication in response to the fusion sensor information for testing into the detection network, to thereby allow the detection network to detect at least part of the second vehicles, the pedestrians, and the lanes on a driving road of the subject autonomous vehicle for testing and thus to output nearby object information for testing, and a process of inputting both sensor values for testing, acquired over the V2V communication in response to the fusion sensor information for testing, and the nearby object information for testing into the drive network, to thereby allow the drive network to generate moving direction probabilities for testing of said each of the k cooperatively-driving vehicles for testing by referring to the sensor values for testing and the nearby object information for testing, and thus to drive the subject autonomous vehicle for testing by referring to the moving direction probabilities for testing.

22. The testing device of claim 21, wherein, at the process of (I), the processor performs a process of inputting the driving image for testing and the multiple pieces of the sensor status information for testing into the sensor fusion network, to thereby allow the sensor fusion network to (i) generate a feature map for testing by applying convolution operation of a CNN to the driving image for testing and generate an image feature vector for testing by applying fully-connected operation to the feature map for testing, (ii) generate a sensor status feature vector for testing by applying recurrent neural network operation of at least one LSTM to the multiple pieces of the sensor status information for testing, and (iii) generate a concatenated feature vector for testing by concatenating the image feature vector for testing and the sensor status feature vector for testing and generate the sensor fusion probabilities for testing by applying fully-connected operation of at least one fully connected layer to the concatenated feature vector for testing.

23. The testing device of claim 22, wherein the processor instructs the sensor fusion network to (i) allow a pooling layer to apply max-pooling operation to the feature map for testing and then (ii) apply fully-connected operation to a result of said (i), to thereby generate the image feature vector for testing.

24. The testing device of claim 22, wherein the processor normalizes and outputs each of the sensor fusion probabilities for testing using a softmax algorithm.

25. The testing device of claim 21, wherein, at the process of (I), the processor performs (i) a process of generating a feature map for testing by applying multiple convolution operation using a specific CNN to the driving image for testing, acquired from a specific cooperatively-driving vehicle among the k cooperatively-driving vehicles for testing, and if an image feature vector for testing is generated by applying fully-connected operation to the feature map for testing, a process of acquiring the image feature vector for testing from the specific cooperatively-driving vehicle over the V2V communication, (ii) a process of generating a sensor status feature vector for testing by applying recurrent neural network operation using at least one LSTM to the multiple pieces of the sensor status information for testing, and (iii) a process of generating a concatenated feature vector for testing by concatenating the image feature vector for testing and the sensor status feature vector for testing acquired over the V2V communication and a process of generating the sensor fusion probabilities for testing by applying fully-connected operation of at least one fully connected layer to the concatenated feature vector for testing.

26. The testing device of claim 25, wherein the specific vehicle allows a specific CNN to apply convolution operation to the driving image for testing to thereby generate a feature map for testing, and to apply fully-connected operation to the feature map for testing to thereby generate the image feature vector for testing, and wherein the specific vehicle is one of the k cooperatively-driving vehicles for testing which is designated sequentially at stated intervals according to a round-robin schedule.

* * * * *